United States Patent
Mollier

(10) Patent No.: US 10,334,916 B2
(45) Date of Patent: Jul. 2, 2019

(54) SUB-ASSEMBLY OF EXTERNAL PARTS FOR TIMEPIECE OR WATCH OR PIECE OF JEWELLERY

(71) Applicant: Omega SA, Biel/Bienne (CH)

(72) Inventor: Adrien Mollier, Merzligen (CH)

(73) Assignee: Omega SA, Biel/Bienne (CH)

( * ) Notice: Subject to any disclaimer, the term of this patent is extended or adjusted under 35 U.S.C. 154(b) by 29 days.

(21) Appl. No.: 15/647,618

(22) Filed: Jul. 12, 2017

(65) Prior Publication Data
US 2018/0027933 A1   Feb. 1, 2018

(30) Foreign Application Priority Data
Jul. 26, 2016   (EP) .................................... 16181143

(51) Int. Cl.
*A44C 9/00*   (2006.01)
*A44C 17/02*   (2006.01)
(Continued)

(52) U.S. Cl.
CPC ................ *A44C 9/003* (2013.01); *A44C 9/00* (2013.01); *A44C 17/0208* (2013.01);
(Continued)

(58) Field of Classification Search
CPC ....... A44C 9/003; A44C 17/0216; A44C 9/00; F16B 5/10; F16B 21/125; A44D 2203/00;
(Continued)

(56) References Cited

U.S. PATENT DOCUMENTS 5,701,765 A * 12/1997 Cerqua .................. A44C 9/003
 63/15
8,547,802 B2 * 10/2013 Hiranuma .............. G04B 19/14
 368/205
(Continued)

FOREIGN PATENT DOCUMENTS

CH  98594  4/1923
CH  2 874 022 A1  5/2015
(Continued)

OTHER PUBLICATIONS

European Search Report dated Apr. 13, 2017 in European Application 16181143.5, filed on Jul. 26, 2016 ( with English Translation of Categories of Cited Documents).

*Primary Examiner* — Edwin A. Leon
(74) *Attorney, Agent, or Firm* — Oblon, McClelland, Maier & Neustadt, L.L.P.

(57) ABSTRACT

A sub-assembly of external parts for a timepiece or watch or piece of jewellery includes a first component and a second component. The sub-assembly includes a bayonet fit between two edges and two wings of skirts of the first component and the second component. The first component and the second component are able to occupy an assembled and indexed position. The first component or the second (Continued)

component including for this purpose, in part in the thickness of the first skirt or second skirt, an elastically deformable zone including a lug for angular indexation between the first component and second component, cooperating with an indexation limit stop of the other component.

12 Claims, 2 Drawing Sheets

(51) Int. Cl.
F16B 5/10 (2006.01)
F16B 21/12 (2006.01)
G04B 37/08 (2006.01)
F16B 7/20 (2006.01)

(52) U.S. Cl.
CPC ............ *A44C 17/0216* (2013.01); *F16B 5/10* (2013.01); *F16B 21/125* (2013.01); *G04B 37/084* (2013.01); *A44D 2203/00* (2013.01); *F16B 7/20* (2013.01)

(58) Field of Classification Search
CPC ............ G04B 37/0463; G04B 37/0427; G04B 37/087; G04B 37/0091
USPC .......................... 368/300, 285, 294–295, 299
See application file for complete search history.

(56) References Cited

U.S. PATENT DOCUMENTS

| | | | |
|---|---|---|---|
| 8,619,506 B2* | 12/2013 | Hiranuma | G04G 17/02 368/205 |
| 8,931,949 B2* | 1/2015 | Erard | G04B 19/28 368/295 |
| 9,977,403 B2* | 5/2018 | Leoni | G04B 37/1486 |

FOREIGN PATENT DOCUMENTS

| | | |
|---|---|---|
| CH | 2 874 022 B1 | 5/2015 |
| CH | 709 475 A2 | 10/2015 |
| CH | 710 451 A1 | 6/2016 |
| DE | 20 2006 012 410 U1 | 11/2006 |
| DE | 20 2008 013 898 U1 | 2/2009 |
| EP | 1 079 284 A1 | 2/2001 |
| EP | 2 476 335 A1 | 7/2012 |
| EP | 2 476 335 B1 | 7/2012 |
| EP | 2 537 431 A1 | 12/2012 |
| EP | 2 806 314 A1 | 11/2014 |
| FR | 2 881 326 A1 | 8/2006 |
| GB | 1 396 574 | 6/1975 |

* cited by examiner

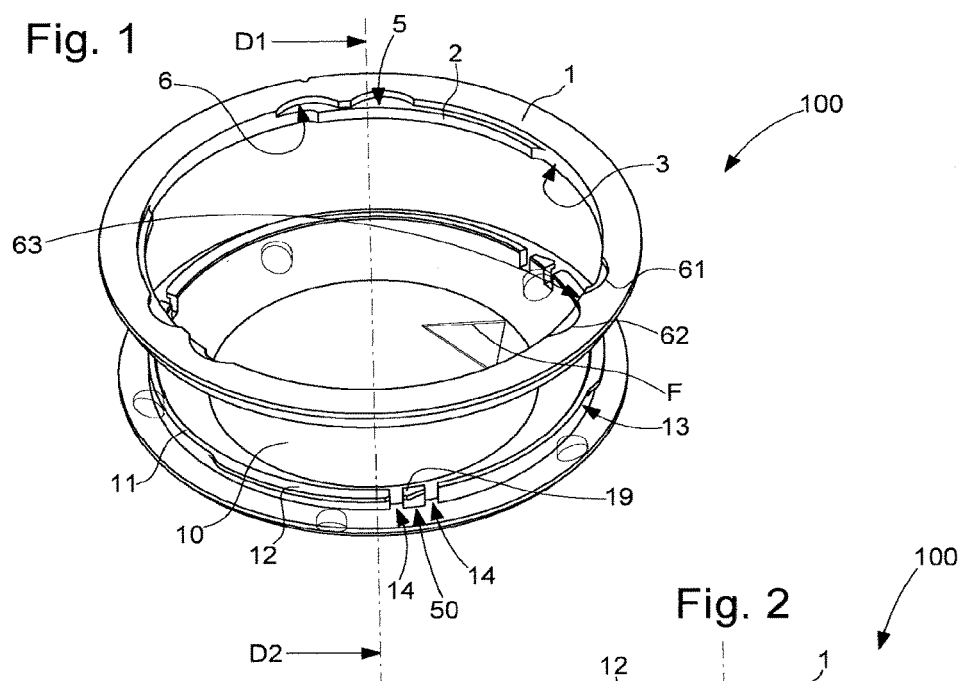
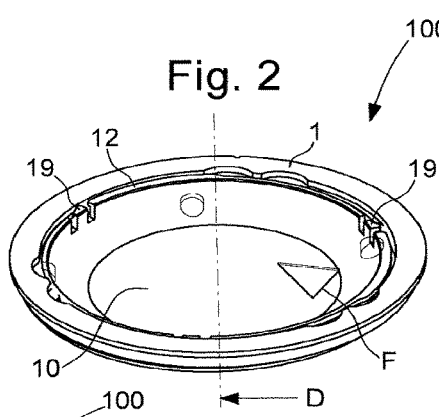
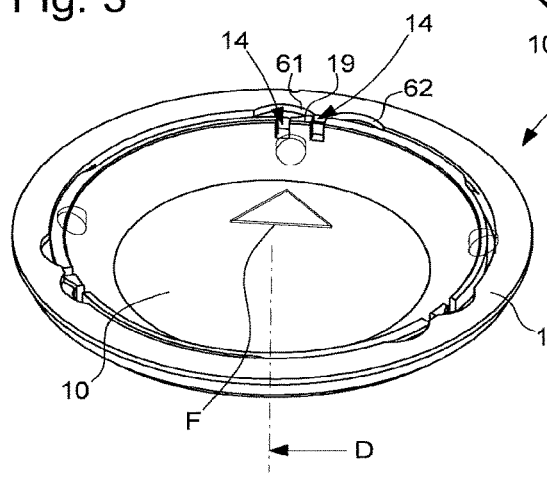
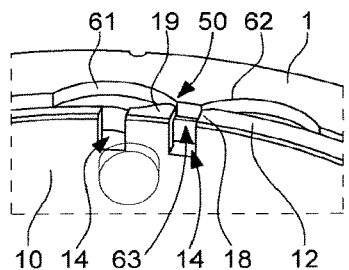

SUB-ASSEMBLY OF EXTERNAL PARTS FOR TIMEPIECE OR WATCH OR PIECE OF JEWELLERY

This application claims priority from European patent application No. 16181143.5 filed Jul. 26, 2016, the entire disclosure of which is hereby incorporated herein by reference.

FIELD OF THE INVENTION

The invention relates to a sub-assembly of external parts, for a timepiece or for a watch or for a piece of jewellery, comprising a first component comprising edges which project from a first skirt, alternating with first undercuts, and a second component comprising wings which project from a second skirt, alternating with second undercuts, provided to occupy a first dismantled position for insertion in which said first component and said second component have, one relative to the other, a first angular orientation or to occupy an assembled and locked position in which said first component and said second component have, one relative to the other, a second angular orientation different from said first angular orientation and are retained axially by a bayonet fit between at least two said edges and at least two said wings.

The invention also relates to a timepiece, in particular a watch, comprising such a sub-assembly of external parts.

The invention also relates to a piece of jewellery comprising such a sub-assembly of external parts.

The invention relates to the field of external parts of watches and the field of gems and jewellery.

BACKGROUND OF THE INVENTION

The external parts of watches and similar apparatus are subject to numerous constraints, in particular of impermeability, robustness, appearance, and must be produced so as to prevent any involuntary dismantling which inevitably results in an after-sales intervention for changing seals, cleaning, lubrication or even repair.

Some components of external parts or for control must, once again, be angularly indexed, one relative to the other, for relocation to the original reference position, inactive or active, or even to facilitate reading of signs or graduations, or for ensuring the continuity of out-of-true and/or decorative surfaces. This angular indexing is often difficult to achieve well, in combination with good locking of the components and with perfect sealing of the joints.

Document EP2476335A1, in the name of De Retz, describes a piece of jewellery with two lateral annular bodies, the diameters of which are greater than a diameter of a central annular body. One of the lateral bodies is assembled with the central body in a removable manner in order to position and remove the annular decorative elements. A magnetic locking unit, i.e. a tooth, retains the lateral bodies on the central body in an assembled position defined by another locking unit between the lateral and central bodies, along a degree of freedom. This latter locking unit is formed by a projecting unit, i.e. a fillet, by a projecting part and a groove provided with an open part and a closed part.

Document EP2537431A1, in the name of Aravelo Martin, describes a device for connecting precious elements to a finger ring, comprising a substantially annular body to be worn on a finger, and a gem support connected to the annular body in an upper region. The substantially annular body comprises, at one point of the latter, a head which is integral with the latter and is inserted and coupled to a lower part of the gem support by means of a bayonet coupling.

SUMMARY OF THE INVENTION

The invention proposes to produce a sealed and secure assembly of components of external parts with perfect angular indexing between these components.

To this end, the invention relates to a sub-assembly of external parts for a timepiece, comprising a first component comprising edges which project from a first skirt, alternating with first undercuts, and a second component comprising wings which project from a second skirt, alternating with second undercuts, provided to occupy a first dismantled position for insertion in which said first component and said second component have, one relative to the other, a first angular orientation or to occupy a second assembled and locked position in which said first component and said second component have, one relative to the other, a second angular orientation different from said first angular orientation and are retained axially by a bayonet fit between at least two said edges and at least two said wings, characterised at least said first component or said second component comprises, at least in part in the thickness of said first skirt or respectively second skirt, at least one elastically deformable zone comprising a lug which is provided to cooperate, by indexing in a relative position between said first component and second component, with a limit stop for angular indexation and locking, which the other of said first component and second component comprises, and characterised, in said first dismantled position for insertion, said first component and said second component have, one relative to the other, a first angular orientation, and are retained at a distance, one from the other, by repulsion means, which comprise magnetic repulsion means and/or at least one elastic element and/or at least one sealing joint, and, in said second assembled and locked position, said first component and said second component are retained axially counter to the resistant force exerted by said repulsion means.

The invention also relates to a timepiece comprising such a sub-assembly of external parts.

The invention also relates to a piece of jewellery comprising such a sub-assembly.

BRIEF DESCRIPTION OF THE DRAWINGS

Other features and advantages of the invention will appear upon reading the detailed description which will follow, with reference to the annexed drawings, where:

FIG. 1 illustrates, schematically in exploded perspective, a particular variant of a sub-assembly of external parts according to the invention, comprising a first component which is a middle, below which a second component which is a back cover is illustrated, including an arrow indicating an angular indexing direction, and presented for fixing thereof in bayonet mode on the first component;

FIG. 2 illustrates, similarly to FIG. 1, the same sub-assembly after insertion supported by the second component on the first component, in a first angular orientation corresponding to the free passage of the bayonet;

FIG. 3 illustrates, similarly to FIG. 2, the same sub-assembly in a closed position following complete closure of the bayonet, after rotation achieved by perfect relative angular indexing of the second component relative to the first component, in a second indexing position;

FIG. 4 is a partial perspective view of this sub-assembly of external parts, where the first component and the second component are in a stable indexed position thanks to a lug of one, here the back cover, situated in an elastically deformable zone in the vicinity of a slot, cooperating with a limit stop which the other comprises, here the middle;

DETAILED DESCRIPTION OF PREFERRED EMBODIMENTS

Figure 5:
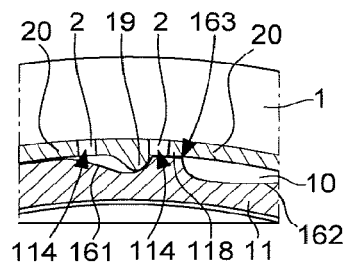
FIG. 5 is a view similar to FIG. 4 of another variant of the sub-assembly according to the invention, where it is the middle which comprises such an elastically deformable zone comprising the lug.
Figure 6:
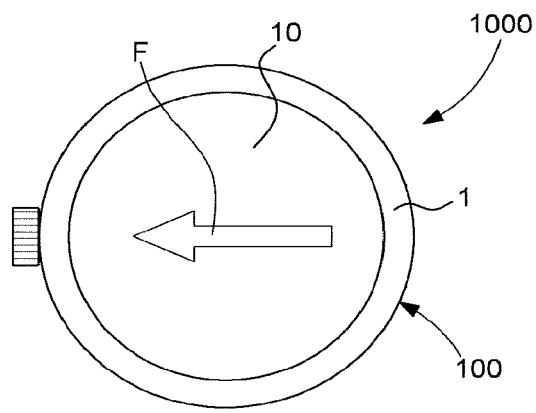
FIG. 6 illustrates, schematically and in a view from below, a watch comprising such a sub-assembly, a middle of which forms the first component, and a back cover forms the second component.

The invention proposes to produce a sealed and secured assembly of components of external parts with angular indexing which is easy to adjust, and the latter with a minimum number of components.

FIGS. 1 to 5 illustrate the non-limiting example of the angular indexing of a back cover relative to a watch middle.

The invention relates to a sub-assembly of external parts 100 for a timepiece, and more particularly for a watch or for a piece of jewellery, comprising a first component 1 comprising edges 2 which project from a first skirt 6, alternating with first undercuts, and a second component 10 comprising wings 12 which project from a second skirt 11, alternating with second undercuts 13.

The general term "sub-assembly of external parts" is used here for both a timepiece and for a piece of jewellery even if this term is only of current use in clockmaking. It is understood that, in the case of jewellery, this sub-assembly can concern the structure of the piece of jewellery or elements connected to a back cover structure, or any assembly of a plurality of elementary or pre-assembled components, or even the entire piece of jewellery.

This sub-assembly of external parts 100 is provided to move from a first dismantled position for insertion, to a second assembled and locked position.

In a particular non-limiting variant, comprising repulsion means provided at the level of the interface between the first component 1 and the second component 10, the latter tend to be retained at a distance, one from the other, by repulsion means, which comprise magnetic repulsion means and/or at least one elastic element and/or at least one sealing joint. Passage from the first dismantled position for insertion to the second assembled and locked position is effected by the action of force exerted by an operator: an axial force for overcoming the resistant force of the repulsion means and putting in contact the first component 1 and the second component 10, and a torque for bringing them into an angular and supported indexation position.

In the first dismantled position for insertion, the first component 1 and the second component 10 have, one relative to the other, a first angular orientation.

In a particular, non-limiting variant comprising repulsion means provided at the level of the interface between the first component 1 and the second component 10, the latter tend to be retained at a distance, one from the other, by repulsion means which comprise magnetic repulsion means and/or at least one elastic element and/or at least one sealing joint, lug or projection. Passage from the first dismantled position for insertion to the second assembled and locked position is effected by the action of force exerted by an operator: an axial force for overcoming the resistant force of the repulsion means and putting in contact the first component 1 and the second component 10, and a torque for bringing them into an angular and supported indexation position.

In the second assembled and locked position, the first component 1 and the second component 10 have, one relative to the other, a second angular orientation different from the first angular orientation. In the particular variant comprising repulsion means, the first component 1 and the second component 10 are retained axially counter to the resistant force exerted by these repulsion means, by the effect of a bayonet fit, produced by applying axial and torque forces, applied by the operator, between at least two edges 2 and at least two wings 12.

This integration of the first component 1 and of the second component 10, by a bayonet fit, in particular about an axial direction D, is reversible, and allows dismantling thereof. In a manner according to the invention and in a deviation from prior art, this dismantling requires, on the part of an operator, force similar to that exerted during assembly, this dismantling preferably requires the use of a special tool, cooperating for example with holes or peripheral notches, or similar, and cannot result from clumsiness or exposure to particular external physical factors.

According to the invention, at least the first component 1 or the second component 10 comprises at least one elastically deformable zone 50, radially in the case of the Figures, in such an edge 2 or respectively such a wing 12. And the sub-assembly of external parts 100 comprises at least one elastically deformable zone 50, radially in the case of the Figures, comprising a lug 19 which is provided to cooperate, by indexing in a relative position between the first component 1 and the second component 10, with a limit stop for angular indexation and locking 63, 163, which the other of the first component 1 and second component 10 comprises.

More particularly, as far as a non-limiting variant comprising repulsion means is concerned, the invention relates to a sub-assembly of external parts 100 for a timepiece or watch, comprising at least one sealing joint between a first component 1 and a second component 10.

More particularly and in particular in the variants illustrated by the Figures, the edges 12 of the first component 1 substantially of revolution relative to a first axial direction D1, and the wings 12 of the second component 10 are substantially of revolution relative to a second axial direction D2. These wings 12 project radially towards the outside relative to the second skirt 11 and are of an angular amplitude less than or equal to that of the first undercuts 3 through which the wings 12 can be inserted during axial assembly of the first component 1 with the second component 10, according to a common axial direction D according to which the first axial direction D1 and the second axial direction D2 are aligned. The first component 1 or the second component 10 comprises, at least in part in the thickness of the first skirt 6 or respectively second skirt 11, such a radially elastically deformable zone 50.

More particularly, at least one elastically deformable zone 50 is provided in the vicinity of the at least one elastic slot 114, 14 which such an edge 2 or respectively one such wing 12 comprises.

More particularly again, the elastically deformable zone 50 is provided in the vicinity of at least one elastic slot 114, 14, in the projecting part of an edge 2 or respectively of a wing 12. In the particular embodiment visible in FIG. 4 or 5, this zone 50 is delimited by two such parallel slots 14 or 114 as the case may be.

More particularly, the lug 19 projects from an edge 2 or a wing 12. In the variant of FIG. 5, the edge 2 carries an external skirt 20, substantially of revolution about the first axial direction D1 which bears the lug 19.

In the particular and non-limiting embodiments of FIGS. 1 to 5, the limit stop 63, 163 is delimited by cavities 61 and 62, 161 and 162, in particular produced by milling, or by injection, or other, the profile of the cavities being simple enough (here a simple hollow cylindrical sector) to be produced by any means. Advantageously, such a limit stop 63, 163 is cramped between, on a first side, the lug 19 and, on a second side, an end 18, 118 which an edge part 2 or a wing 12 or the edge 2 comprises, as the case may be, which is more rigid than the elastically deformable zone 50.

In an advantageous, non-limiting application, illustrated by FIGS. 1 to 6, the first component 1 is a middle and the second component 10 is a back cover. In total, in the variant illustrated by FIGS. 1 to 4, the back cover 10 comprises at least one split skirt 11 which bears one or more lugs 19 in order to allow indexation and locking on the middle 1. This middle 1 advantageously has a geometry obtained by milling, which will be situated in the lug or lugs 19 of the back cover 10 and will lock the system in the indexed position. This radial clipping is reliable and economical. Accidental reopening is not possible because the profile of the cavity 61 advantageously comprises a part with a steep slope which requires application of a large torque for releasing applied with the help of a tool, in order to allow reopening of the back cover which is thus impossible for the user, and the preserve of maintenance and after-sales personnel. In this case of the Figure, in a particular variant, the presence of at least one sealing joint is required. In a non-illustrated variant, the first component 1 is a back cover and the second component 10 is a visible part, such as a medallion or similar, connected to this back cover, in which case a joint between them is not necessary and the presence of a spring being perfectly adequate in a variant comprising repulsion means.

It is noted, in this regard, that the invention can be implemented without such repulsion means, in particular for casing applications or similar.

Of course, it is possible to produce the first component and the second component, each comprising an elastically deformable zone, however the illustrated embodiment where a single one of the components comprises an elastically deformable zone is the least costly to produce.

If the axial compression of the sealing joint is the most standard, the invention also allows without difficulty assembly with radial compression of such a joint.

It is understood that the invention is illustrated here in a particular variant, with edges and radially projecting wings. The invention is also applicable to other variants where the axial and radial configurations are reversed.

Figure 7:
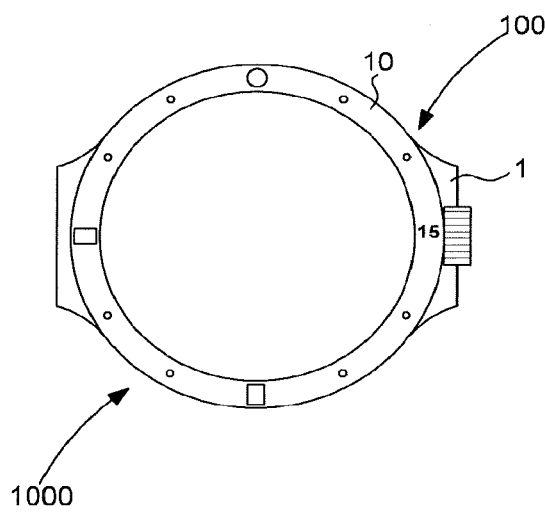
FIG. 7 illustrates, schematically and in a view from above, a watch comprising such a sub-assembly, a middle of which forms the first component, and a bezel forms the second component.

In another application, the first component 1 is a middle and the second component 10 is a flange or a bezel, such as is visible in FIG. 7.

This case is well suited to a variant in which a first component and a second component tend to be distant one from the other, by magnetic repulsion or even by an elastic element, such as a washer, i.e. a thin ring, not necessarily closed, or more particularly a washer comprising segments analogous to a ratchet in order only to allow unidirectional manoeuvring easily, as in the particular case of use of the invention for a unidirectional bezel. Such a washer can be wire-shaped, substantially round in section or even with a rectangular section or other.

In a particular embodiment, when these repulsion means are of a mechanical type and comprise at least one elastic element and/or at least one sealing joint, this elastic element and/or sealing joint is continuous, of a substantially annular free shape, and is mounted substantially on the periphery of the first component 1 and of the second component 10. More particularly again, this elastic element and/or sealing joint is housed partially in a continuous groove which the first component 1 and/or the second component 10 includes.

Figure 8:
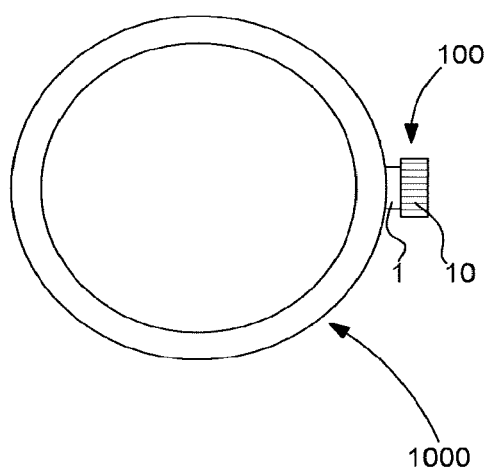
FIG. 8 illustrates, schematically and in a view from above, a watch comprising such as sub-assembly, a tube of which fixed to a middle forms the first component, and a crown forms the second component.

In yet another application, the first component 1 is a middle or a tube connected to a middle, and the second component 10 is a crown, such as visible in FIG. 8. In one variant, the second component 10 is a crown rod or a push button. In these cases also, the presence of at least one sealing joint is obligatory.

The invention is suitable for numerous applications in clockmaking, for example for a helium valve on a diving watch, or even for components of external parts, such as a strap, a buckle, a closure or other. The same applies for pieces of jewellery, in order to effect closure of sleeve buttons, earrings or even for fixing stones or decorative elements designed to be removable.

The invention also relates to a timepiece, in particular a watch 1000, comprising such a sub-assembly of external parts 100.

The invention also relates to a piece of jewellery comprising such a sub-assembly 100.

The invention makes it possible, hence, to prevent any inadvertent or involuntary dismantling of the sub-assembly 100, for example by the effect of vibrations, successive expansion cycles, by untoward use by the user, or other.

The invention makes it possible to ensure perfect orientation of a component retained locked in the position of use thereof.

The invention also makes it possible for components which are opposed and produced from materials of various natures, without the constraint of expansion, friction, elasticity, or other, without requiring an exterior fixing element such as a screw or similar, without a thread or machining risking weakening the particular materials such as ceramics, sapphire and similar. It has very good resistance to accidental unscrewing or even a deliberate one by vibration or of the Chapuis impact type.

The invention also makes it possible to ensure interchangeability of components and, consequently, increased personalisation of the watches or the pieces of jewellery by the users.

This invention is applicable both to watches or pieces of jewellery produced in precious materials and to large-scale productions comprising components of low unitary cost, in particular made of plastic material or similar.

The invention lends itself well to cases where the sub-assembly 100 comprises components 1 and 10 produced in different materials, with different coefficients of expansion, or even fragile materials, or hard ones (ceramic, sapphire, precious stones, gems, cameos) which do not allow standard fixing methods. There may be mentioned, amongst standard configurations, assembly of a middle made of gold or with a sapphire back cover, or even a case entirely made of ceramic, a combination of metal-ceramic, or similar. The components 1 and 10 can also be produced in all sorts of materials: metallic alloys, in particular precious or standard stainless steels, at least partially amorphous metallic alloys, or "Liquidmetal©" or similar, ceramics, sapphire, minerals, hard stones, rubber, plastic materials and in particular thermoplastic elastomers, termed TPE, of which in particular thermoplastic polyurethane, termed TPU, polycarbonates, termed PC, polyvinyl chlorides, termed PVC, polyacetals or polyoxymethylene, termed POM, silicone, "Nylon®", to mention, in a non-limiting manner, only normal materials in timepiece construction and in jewellery-making.

What is claimed is:

1. A sub-assembly of external watch parts, comprising:
a first component comprising edges which project from an inner face of a first skirt and first undercuts in the inner face that are positioned axially above each of the edges, and
a second component comprising wings which project radially outward from a second skirt and second undercuts,
wherein said first component and said second component are provided to occupy a first dismantled position for insertion in which said first component and said second component have, one relative to the other, a first angular orientation or to occupy a second assembled and locked position in which said first component and said second component have, one relative to the other, a second angular orientation different from said first angular orientation and are retained axially by a bayonet fit between at least two said edges and at least two said wings,
wherein at least said first component or said second component comprises, at least in part in the thickness of said first skirt or respectively second skirt, at least one elastically deformable zone comprising a lug which is provided to cooperate, by indexing in a relative position between said first component and second component, with a limit stop for angular indexation and locking, which the other of said first component and second component comprises, and
wherein, in said first dismantled position for insertion, said first component and said second component have, one relative to the other, a first angular orientation, and are retained at a distance, one from the other, by repulsion means, which comprise magnetic repulsion means and/or at least one elastic element and/or at least one sealing joint, and, in said second assembled and locked position, said first component and said second component are retained axially counter to the resistant force exerted by said repulsion means.

2. The sub-assembly of external watch parts according to claim 1, wherein said repulsion means comprise at least one sealing joint.

3. The sub-assembly of external watch parts according to claim 2, wherein said repulsion means comprise at least one sealing joint, said edges project radially towards the inside of said first skirt, said wings project radially towards the outside of said second skirt and said zone is radially elastically deformable.

4. The sub-assembly of external watch parts according to claim 2, wherein said at least one sealing joint is continuous, of a substantially annular free shape, and is mounted substantially on the periphery of said first component and of said second component.

5. The sub-assembly of external watch parts according to claim 1, wherein said first component comprises, substantially of revolution relative to a first axial direction, said edges which project radially towards the inside of said first skirt, alternating with said first undercuts, and said second component comprises, substantially of revolution relative to a second axial direction, said wings which project radially towards the outside relative to said second skirt, and of an angular amplitude less than or equal to that of said first undercuts through which said wings can be inserted during axial assembly of said first component with said second component, according to a common axial direction according to which said first axial direction and said second axial direction are aligned, and at least said first component or said second component comprises, at least in part in the thickness of said first skirt or respectively second skirt, a said radially elastically deformable zone.

6. The sub-assembly of external watch parts to claim 1, wherein at least one elastically deformable zone is provided in the vicinity of at least one elastic slot of a said edge or respectively or of a said wing.

7. The sub-assembly of external watch parts according to claim 6, wherein said elastically deformable zone is provided in the vicinity of at least one elastic slot, in the projecting part of a said edge or respectively of a said wing.

8. The sub-assembly of external watch parts according to claim 1, wherein said first component is a middle and said second component is a back cover of the watch.

9. The sub-assembly of external watch parts according to claim 1, wherein said first component is a middle and said second component is a flange or a bezel.

10. The sub-assembly of external watch parts according to claim 1, wherein said first component is a middle or a tube connected to a middle, and said second component is a crown.

11. A watch comprising the sub-assembly of external watch parts according to claim 1.

12. The sub-assembly of external watch parts according to claim 1, wherein the wings of the second component each include a lug projecting radially outward and slots on each side of the lug, the slots each being an opening in the wing that extends through a thickness of the second component.

* * * * *